Sept. 30, 1941.  W. HULSEBOS  2,257,258
NONJAMMING ROLLING SURFACE FOR WOBBLER MECHANISMS
Filed Oct. 30, 1937
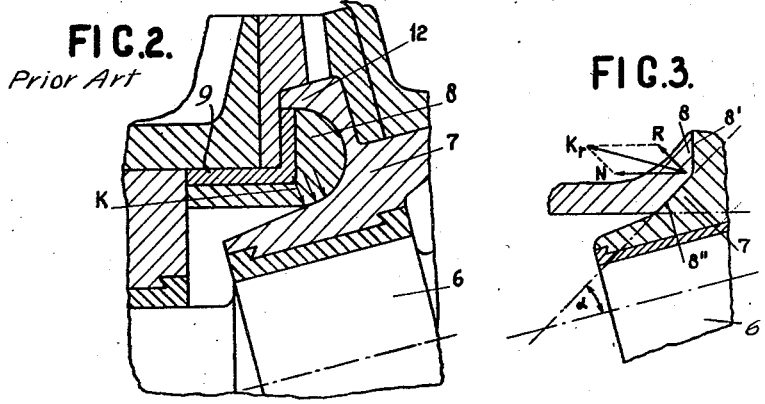
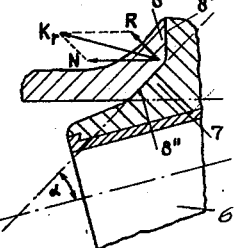
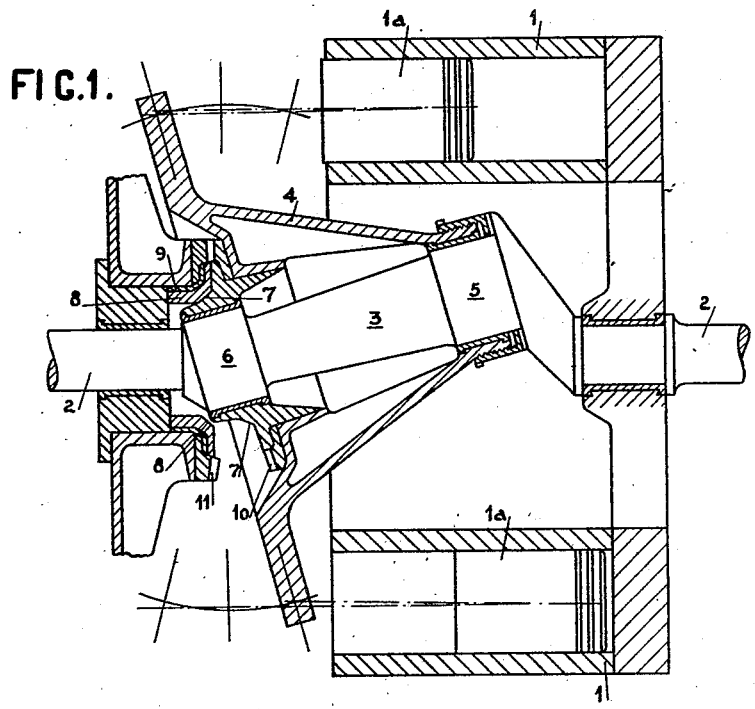
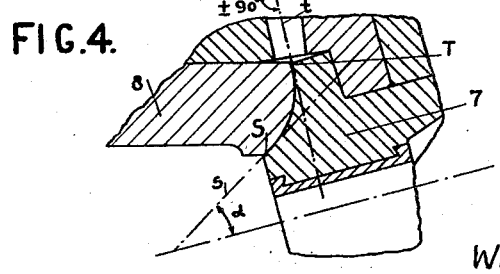
WICHERT HULSEBOS
INVENTOR
By: Haseltine, Lake & Co.
ATTORNEYS Patented Sept. 30, 1941

2,257,258

UNITED STATES PATENT OFFICE 2,257,258

NONJAMMING ROLLING SURFACE FOR WOBBLER MECHANISMS

Wichert Hulsebos, Laren, Netherlands, assignor to Naamlooze Vennootschap: Hulsemo, Utrecht, Netherlands Application October 30, 1937, Serial No. 171,994
In the Netherlands November 12, 1936

4 Claims. (Cl. 308—135)

This invention relates to wobbler or swash plate mechanism in which the longitudinal thrust of the pistons or plungers is taken by an annular pressure surface on the wobbler or swash plate which rolls on an annular pressure surface on the fixed frame of the mechanism, and particularly to that type wherein the pressure surfaces in contact have special shapes and characteristics.

The main object of my invention is to introduce very efficient means for taking axial and radial thrusts of the wobbler or swash plate which occur about the crankshaft, and thereby greatly reduce friction and wear on said crankshaft and its bearings as well as on the bearings upon the swash plate which are in contact with the crankshaft.

Another object is to improve the construction of wobbler or swash plate mechanism so as to increase its efficiency and greatly increase the durability and useful life of the parts thereof.

According to the invention, in one aspect that part of the pressure surfaces intended to oppose outward radial loads is so shaped as to make an angle with the surface of the inclined crankpin on which the wobbler bears which is not less than twice the angle of friction between said surfaces. If said bearing surface, which is situated near the pressure surfaces is parallel to the axis of the inclined crankpin, said angle may be defined as the angle between the axis of the crankpin and the pressure surfaces. For convenience's sake this will be done hereafter. The angle of friction of course varies with the material of which the surfaces are composed, the properties of the lubricant between them and the relative velocity, but in practice for hardened steel surfaces such as are usually employed, the angle of friction may be taken to be 6° and therefore the angle between the co-operating pressure surfaces and the axis of the crankpin should be not less than 12°.

In another aspect the invention includes the provision of a pressure surface on the fixed frame of the mechanism which consists exclusively of parts arranged to oppose loads directed parallel to the axis and of parts disposed to resist loads directed radially outwards.

In one form of the invention the pressure surface on the fixed frame is made up of two distinct parts, namely an outer annular part which is either flat or is a cone of large apex angle and an inner annular part which is conical, the corresponding surfaces on the wobbler being so formed as to roll upon the said surfaces and the angle between the inner conical part and the axis of the crankpin being not less than twice the angle of friction.

In another form of the invention the profile of the surfaces, instead of being made up of two distinct parts, is a continuous curve, the surface on the fixed frame being convex and that on the wobbler or swash plate being concave, and the angle between the tangent to the concave curve at its inner margin and the axis of the crankpin being not less than twice the angle of friction.

Other objects and the various advantages of my invention will appear more fully in detail as this specification proceeds.

Referring now to the accompanying drawing forming part hereof,

Figure 1 is a side elevation in central cross-section of a wobbler or swash plate engine or pump made according to this invention, and embodying its salient features in a practical form, Figure 2 is an enlarged detail view illustrating those parts of the mechanism of Figure 1 which are particularly improved by the present invention, Figure 3 is a detail view of part of Figure 1, Figure 4 is a detail of a modification.

Throughout the views, the same reference indicia denote the same or like parts.

Examples of such pressure surfaces as above referred to are described and illustrated in British Patent No. 440,545. In that patent there is described with reference to Figure 2 pressure surfaces which not only oppose the longitudinal thrust, that is to say, the component of the thrust parallel to the axis of the crankshaft, but also components of this thrust acting radially.

It has been found that pressure surfaces arranged to resist radial loads such as are illustrated in Figure 2 of the aforesaid reference tend to set up heavy local stresses owing to a jamming or self-clamping action between certain of the parts. Moreover, these surfaces are usually designed to take radial loads directed both outwardly and inwardly but this has now been found to be unnecessary, because inwardly directed radial loads are always relatively small in amount even under unfavorable conditions of working, and the presence of pressure surface designed to oppose such loads was liable to set up undesirable local stresses.

Referring again to the drawing herein, Figure 1, the cylinders 1 are spaced around the crankshaft 2 with their axes parallel to the axis of the crankshaft. The wobbler or swash plate 4 is mounted on the inclined crankpin 3 the bearing surfaces 5 and 6 of which are disposed near its two ends as shown. The connections between the pistons 1a and the wobbler or swash plate 4 are not shown but may, for example be of the kind described in British Patent No. 350,308, or as otherwise well known.

The wobbler 4 is provided with a hardened steel pressure member 7 co-operating with a stationary pressure member 8 also of hardened steel secured to the frame of the engine or pump through the medium of a ring 9. The wobbler also carries a bevel gear wheel 10 co-operating with a similar bevel gear wheel 11 fixed to the frame, these two gear wheels meshing together and taking the torque reaction in the manner described in patent specification No. 440,545.

Referring now to Figure 2, it will be seen that the tangents to the curved surface of part 7 at the points indicated by the arrows K make very small angles with the axis of the crankpin 3, and this leads to a jamming or self-clamping action between these surfaces and the adjacent surface of the bearing member 6, thereby subjecting the bearing surfaces to excessive load and consequent wear. Moreover, the overhanging or inwardly-facing ledge 12 of the part 7 tends to lead to similar jamming or self-clamping action causing heavy local stresses.

In contrast with this the surface of the pressure member 8, as shown in Figures 1 and 3, is made up of two portions having straight profiles, namely an outer portion 8' which is substantially flat so that the axis of the crankshaft 2 is normal to it, and an inner portion 8" which is conical, so that the corresponding surface on the pressure member 7 makes an angle $x$ which is not less than 12° and preferably about 15°. The surface 8' takes the longitudinally directed component N (Figure 3) of the load Kr between the wobbler or swash plate and the frame while the surface 8" takes the component R of that load.

Owing to the absence of an overhanging or inwardly directed portion such as 12 in Figure 2, the only wedging action that can occur is between the surface 8" and the adjacent bearing surface 7, and as the angle between these surfaces is greater than twice the angle of friction, no jamming or self-clamping action can take place.

Referring now to Figure 4, the surfaces of the pressure members are formed as two continuous curves. The tangent $t$ to these curves at the point T makes an angle of the order of 90° with the axis of the crankshaft, and the tangent $s$ at the point S makes an angle $\alpha$ with the axis of the crankpin which is not less than 12°. This construction has the advantages explained above, but the form illustrated in Figures 1 and 3 is preferred in some conditions because it is easier and thus more economical to manufacture than that shown in Figure 4.

Manifestly, the forms shown are not intended to limit application of the invention but are merely given by way of practical examples, and hence, variations may be resorted to and features used without others within the scope of the appended claims.

Having now fully described my invention, I claim:

1. In an axial thrust bearing for the crankshaft of a wobbler engine of the type having an inclined crank fixed between two aligned straight portions upon said crankshaft, there being bearings for said aligned portions, and a wobbler element bearing on said crank, the feature including a stationary bearing member comprising a generally annular thrust bearing pressure surface portion concentric with and surrounding the main axis of rotation of the crankshaft, and a corresponding movable bearing member adapted to be located upon the crank with said wobbler element and including a second annular thrust bearing pressure surface portion concentric with and surrounding the inclined axis of the inclined crank and making rolling contact against said stationary pressure surface portion, said stationary pressure surface having a surface form which converges towards the straight portion of the crankshaft adjacent the point at which said inclined crank directly joins said straight portion so that said stationary pressure surface portion will serve as an end bearing or abutment for the pressure surface on the wobbler element against outward radial displacement of the latter, the angles between tangents extended in a plane coinciding with the crank axis from said stationary pressure surface portion and the pressure surface portion of the crank on which the wobbler element bears being at least twice the angle of friction between the contacting pressure surface portions and the wobbler element and crank surface respectively.

2. An axial thrust bearing according to claim 1, wherein the two corresponding pressure surface portions are of hardened steel and the effective angle is at least 12°.

3. An axial thrust bearing according to claim 1, wherein the sectional profile of the two corresponding pressure surface portions is a continuous curve, the profile of the stationary pressure surface portion being convex and the profile of the pressure surface portion associated with the wobbler being concave, and the angle between the tangent of the concave profile curve at its inner margin and the pressure surface portion of the crank which rolls against the stationary pressure surface portion is at least twice the angle of friction.

4. An axial thrust bearing according to claim 1, wherein the two corresponding pressure surface portions are of hardened steel and the effective angle of contact is at least 12°, and wherein the sectional profile of the pressure surface portions is a continuous curve, the profile of the stationary pressure surface portion being convex and the profile of the pressure surface portion associated with the wobbler being concave, and the angle between the tangent of the concave profile curve at its inner margin and the axis of the inclined crank is at least twice the angle of friction.

WICHERT HULSEBOS.